Jan. 11, 1966  M. RIPPSTEIN  3,228,066
FORMING PRESS
Filed April 22, 1963
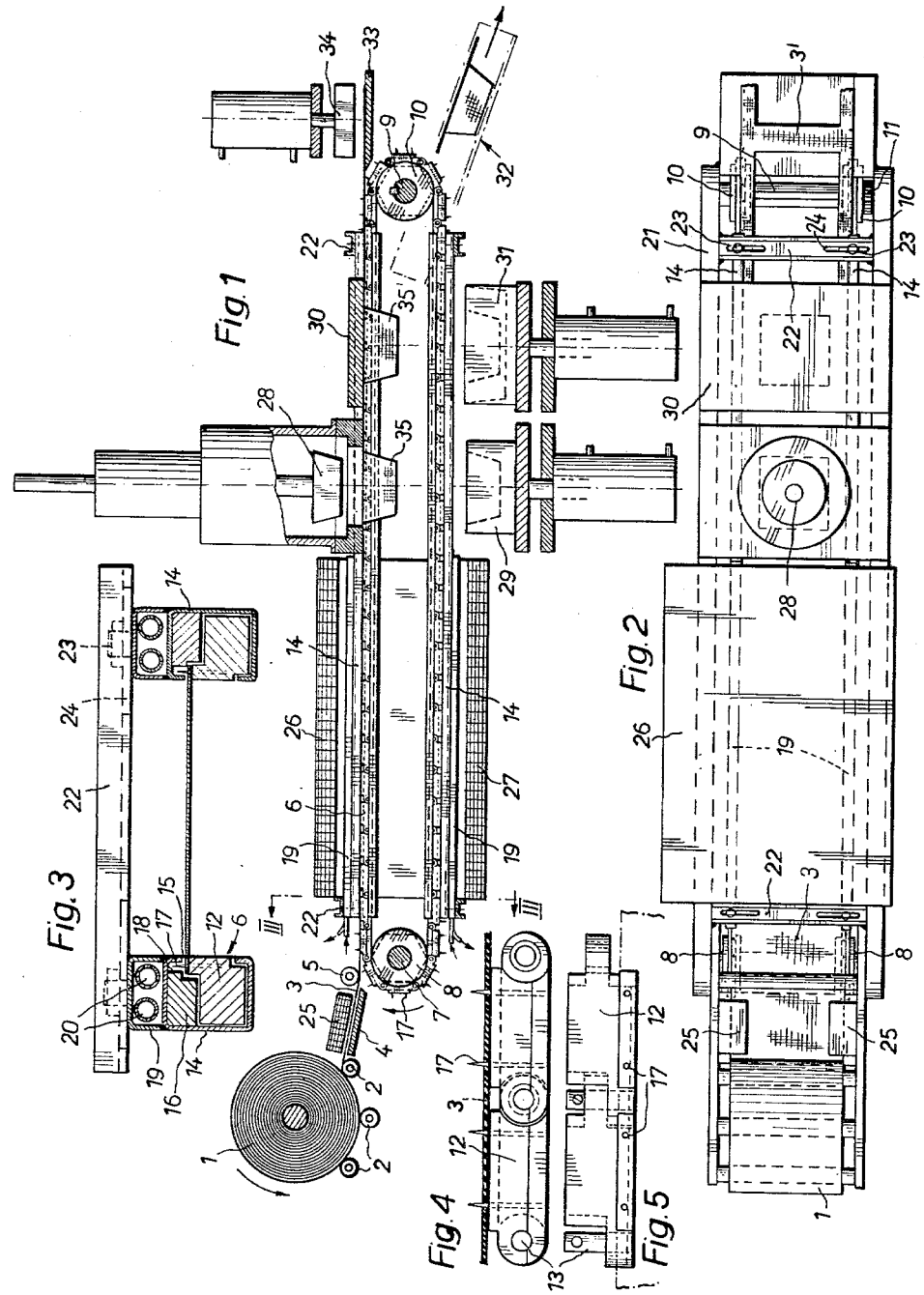
Marly Rippstein
Inventor
By Wenderoth, Lind and Ponack
Attorneys United States Patent Office 3,228,066
Patented Jan. 11, 1966

3,228,066
FORMING PRESS
Marly Rippstein, 38 Burenweg, Birsfelden,
Basel-Land, Switzerland
Filed Apr. 22, 1963, Ser. No. 274,559
Claims priority, application Switzerland, Apr. 24, 1962,
4,870/62
5 Claims. (Cl. 18—19)

This invention relates a forming press for the production of articles from a plastic foil which receives its feed motion by means of conveyor chains.

It is an object of the invention to provide a forming press of this type in which the conveyor chains are provided with protruding foil engaging members which are adapted to penetrate through the edges of the foil.

A preferred embodiment of the invention is illustrated in the accompanying drawings, in which, FIG. 1 is a longitudinal sectional view of the press, only such parts are shown which are essential for the comprehension of the invention;

FIG. 2 is a plan view of the press;

FIG. 3 is a transverse section of the press along the line III—III of FIG. 1, illustrated however in a larger scale;

FIG. 4 is a view in elevation of two conveyor chain members;

FIG. 5 is a top view of the chain members of FIG. 4.

As can be seen from FIGURES 1 and 2, a foil 3 is drawn off from a delivery roll 1 supported on rollers 2, and passes over a guide plate 4 and below a holddown roller 5 to a pair of parallel endless conveyor chains 6 spaced from each other. Each conveyor chain passes around a chain wheel 8 loose upon an axle 7, and around a driving chain wheel 10 keyed to a driving shaft 9. The shaft 9 is driven by means of a pinion 11 connected in any conventional manner to a driving motor not shown. The driving chain wheels 10 on the shaft 9, as also the rotating chain wheels 8 on the shaft 7, are freely slidable in axial direction, for a purpose which will be explained later.

The conveyor chains 6 comprise, as can be clearly seen in FIGURE 3, chain links 12 which are laterally offset in cross section (see also FIGURES 4 and 5) and connected together by means of hinge pins 13. Both stringers of the conveyor chains 6 run in the guide rails 14, (see FIGURE 3) which in cross section have the form of an inwardly flanged channel iron, the slot 15 of which is situated in a vertical plane and faces inwardly. The chain links slide between the lower flange of the guide rail 14 and a holddown ledge 16 arranged therein, the offset portion of the chain link engaging the slot 15 of the rail 14. The offset portion of each chain link is provided with projecting driver spikes 17 which extend into a gap 18 in the guide rail, between the holddown ledge 16 and the inner flange of the rail. A cooling jacket 19 is secured to each guide rail, which contains conduits 20 of a cooling agent circuit. The purpose of this arangement is to cool the conveyor chains if necessary.

The guide rails 14, are secured in the frame of the press 21 (see FIGURE 2) on two transverse girders 22 by means of screw bolts 23 which extend through slots 24 of the transverse girder 22, so that the guide rails are laterally displaceable, in order to enable the spacing between both conveyor chains 6 to be adapted to the width of the foil to be formed. The guide rails could also be mounted on two oppositely threaded spindles, so that by rotation of the spindles the spacing of the rails can be regulated.

Heating appliances 25 are arranged above the plate 4, (see FIGURES 1 and 2) which are adapted to heat the edges of the foil, prior to the delivery of the same to the conveyor chains. Heating units 26 and 27 which are arranged in conventional manner either above or below the feed path of the foil are connected together in U-shape and are movable in transverse direction, so that the conveyor chains can be easily exposed. Following the heating units in the feeding direction of the foil, forming tools are arranged which are actuated by means of pneumatic or hydraulic cylinders; in the example illustrated the tools comprise a stamp 28 above the foil, and a corresponding matrix 29, arranged in axial alignment below the foil. Following the forming tools, a backing plate 30 is arranged above the foil and a punch 31 is arranged below the foil and actuated either pneumatically of hydraulically. The ejector for the articles formed from the foil is diagrammatically indicated at 32. In addition, a further backing plate 33 is located adjacent to the conveyor-chain in the direction of feed below the foil, and above the counterpart a chopping tool 34 is arranged, actuated either pneumatically or hydraulically in order to chop the scrap foil.

The foil 3 passes under the holddown roller 5 to the intermittently driven conveyor chains 6, while the pointed spikes 17, as clearly seen in FIGURE 1, penetrate through marginal portions of the foil 3. The holddown roller 5, can be arranged to press the foil resiliently onto the needles of the chain. The roll 5 can be mounted close to the chain and provided with grooves 1 for the passage of the spikes 17. With thicker foils this procedure is made easier by heating the edges of the foil by means of the heating units 26. The conveyor chains 6 cause the foil 3 to travel between the heating units 26 and 27, whereupon the tools 28 and 29 effect a forming operation between two consecutive steps of the intermittent conveyor movement, and mold the preheated foil section—for example as illustrated—into a container 35. Simultaneously, the container 35' molded by the preceding forming operation of the tools 28 and 29, is cut from the foil by the punch 31, and by means of the ejector 32 is discharged from the press. The surplus foil 3' (FIG. 2) is then chopped into pieces by the chopping tool 34.

With the described procedure, the fact that the conveyor chains, with their pointed spikes penetrate through the edges of the foil, is especially significant. The foil is thereby held and guided in feeding direction without any slip, and apart from that a distortion of the foil, or a dimensional change thereof during the forming process is completely prevented.

The well known inconvenience, namely that a stretched foil, when it is heated, shrinks back to its original dimension as imparted by the extruder, is avoided.

I claim:

1. A forming press for the production of articles from plastic foil, comprising forming tools, a pair of spaced endless conveyor chains for feeding plastic foil to said forming tools, the chain links of said conveyor chains being provided with protruding driver means adapted to penetrate through marginal portions of the foil to be fed to the forming tools, and a heating appliance arranged ahead of the point where the foil is supplied to said conveyor chains to preheat the edges of the foil.

2. A forming press for the production of articles from plastic foil, comprising forming tools, a pair of spaced endless conveyor chains for feeding plastic foil to said forming tools, the chain links of said conveyor chains being provided with protruding driver means adapted to penetrate through marginal portions of the foil to be fed to the forming tools, heating units for heating the foil supplied to the conveyor chains and means for cooling the chains in the region of said heating units.

3. A forming press for the production of articles from plastic foil, comprising forming tools, a pair of spaced endless conveyor chains for feeding plastic foil to said forming tools, the chain links of said conveyor chains being provided with protruding driver means adapted to penetrate through marginal portions of the foil to be fed to the forming tools, heating units for heating the foil supplied to the conveyor chains, means for cooling the chains in the region of said heating units and slotted rails of C-shaped cross section for guiding said conveyor chains, the edges of the foil extending through the slots into the interior of the rails, whereby they are shielded against the action of heat emitted by said heating units.

4. A forming press for the production of articles from plastic foil, comprising forming tools, a pair of spaced endless conveyor chains for feeding plastic foil to said forming tools, the chain links of said conveyor chains being provided with protruding driver means adapted to penetrate through marginal portions of the foil to be fed to the forming tools, heating units for heating the foil supplied to the conveyor chains, means for cooling the chains in the region of said heating units and slotted rails of C-shaped cross section for guiding said conveyor chains, the edges of the foil extending through the slots into the interior of the rails, whereby they are shielded against the action of heat emitted by said heating units, and cooling conduits connected in a cooling agent circuit for cooling the branch surface of the C-shaped guide rails facing the foil heating units.

5. A forming press for the production of articles from plastic foil, comprising forming tools, a pair of spaced endless conveyor chains for feeding plastic foil to said forming tools, the chain links of said conveyor chains being provided with protruding driver means adapted to penetrate through marginal portions of the foil to be fed to the forming tools, means for the adjustment of the spacing between said two conveyor chains, transverse girders on which said guide rails for the chains are mounted for transverse adjustment, and single straight axles with wheels thereon to support each end of the chains, the wheels being slidable mounted thereon through the medium of key members.

References Cited by the Examiner
UNITED STATES PATENTS

| | | | |
|---|---|---|---|
| 2,229,613 | 1/1941 | Strauch | 18—19 |
| 2,473,404 | 6/1949 | Young | 18—1 |
| 2,490,781 | 12/1949 | Cloud | 18—1 XR |
| 3,078,504 | 2/1963 | Koppehele | 18—1 |

FOREIGN PATENTS

| | | |
|---|---|---|
| 823,499 | 1/1938 | France. |

WILLIAM J. STEPHENSON, *Primary Examiner.*